M. E. WELLER, A. AYRES & W. T. LINTNER.
MEAL-BIN.
No. 176,389. Patented April 18, 1876.
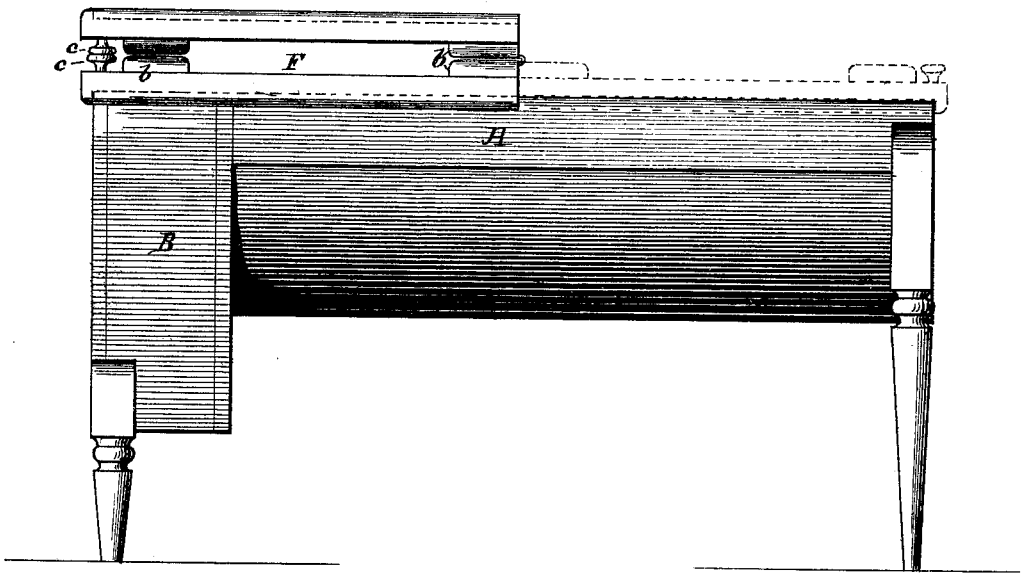
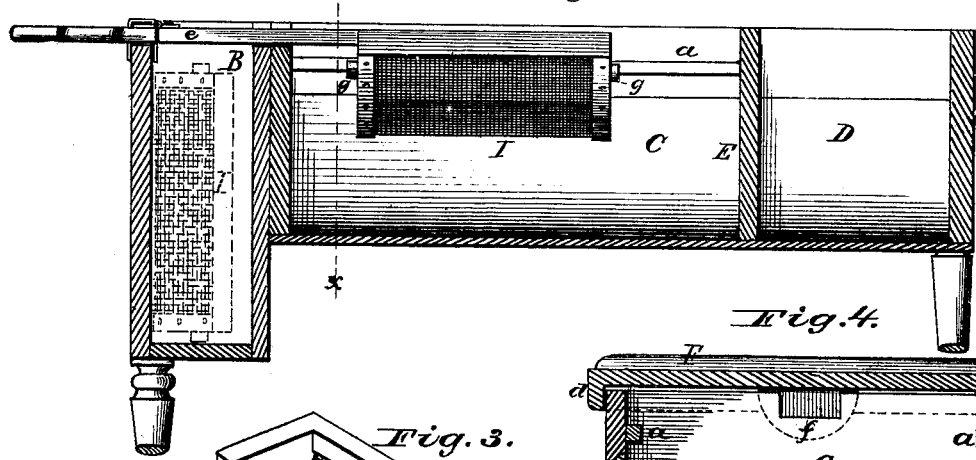
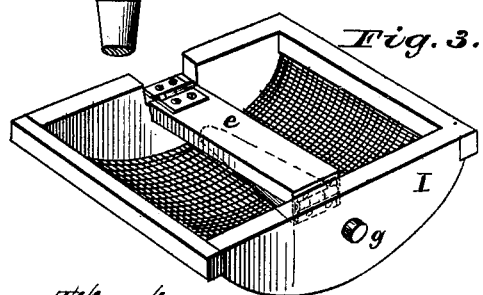
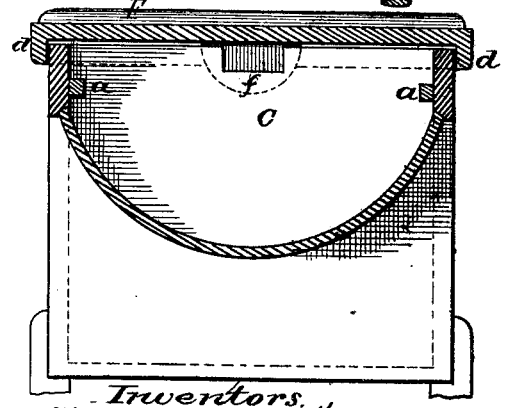

UNITED STATES PATENT OFFICE.

MARVIN E. WELLER, ALBERT AYRES, AND WILLIAM T. LINTNER, OF FORT PLAIN, ASSIGNORS OF ONE-FOURTH THEIR RIGHT TO MOSES C. SMITH, OF STARKVILLE, NEW YORK.

IMPROVEMENT IN MEAL-BINS.

Specification forming part of Letters Patent No. 176,389, dated April 18, 1876; application filed March 16, 1876.

*To all whom it may concern:*

Be it known that we, MARVIN EUGENE WELLER, ALBERT AYRES, and WILLIAM THOMAS LINTNER, all of Fort Plain, in the county of Montgomery, in the State of New York, have invented certain new and useful Improvements in Bread-Trays, whereof the following is a full, clear, and exact description:

Our invention relates to a kitchen utensil or apparatus for use in bread-making; and the invention consists in a bread-tray composed of a movable sieve, a receptacle therefor, a sponge or dough tray, a flour-compartment, and a jointed cover, adapted for use as a rolling or working board, all as hereinafter specified.

In the accompanying drawings illustrating our invention, Figure 1 is a side elevation. Fig. 2 is a longitudinal vertical section. Fig. 3 is a perspective view of the sieve detached, and Fig. 4 a cross-section taken on line $x\ x$ of Fig. 2.

Bread-trays or meal-bins belonging to the class to which our invention relates, as ordinarily constructed, are cumbersome and costly, and but imperfectly adapted to accomplish the ends sought.

It is the object of our invention to produce a simple, compact, and conveniently-arranged apparatus of cheap construction, and having the advantage of easy portability.

As shown in the drawings before referred to, A represents a frame-work or the apparatus generally. B is a compartment therein, at one end of greater length vertically than width, if desired. This compartment is designed as a receptacle for a sieve, I, a particular form of which will be hereinafter specified. C is another compartment, having, preferably, a rounded bottom, and near its longitudinal edges strips or rails $a\ a$. D is a third compartment, separated from C by the division-board E. Compartment C is for use in making the sponge or bread and compartment D forms a flour-receptacle. F is a cover designed to fit over the top of these several receptacles. It is hinged centrally, and its under surface is smoothed and otherwise fitted for use as a rolling-board. The upper or outer surface of this cover is provided with transverse cleats or battens $b$, and, if desirable, suitable handles $c$, so that when one part or half of said cover is turned back upon the other, which will be done when it is to be used as a rolling-board, the half so turned back will be supported in a horizontal position. The edge of this cover is protected by strips projecting below its lower or under surface and forming flanges $d$, whereby said cover is securely held to the body of the tray.

The sieve we prefer to use is of a shape corresponding to the shape of the receptacle C, and when in use it rests and is reciprocated upon the rails $a\ a$ in said receptacle C so as to sift the flour directly into the place where it is to be used. Said sieve may be provided with a jointed handle, $e$, capable of being folded within said sieve, and, when extended, of such length as to project through openings in the walls of receptacles B outside of the tray, where it may be grasped for the purpose of reciprocating the sieve. The opening $f$ is provided with a sliding cap, for use in closing it when the sieve is not in use. When said sieve is not in use its handle is folded into the sieve and the sieve placed edgewise in the receptacle B. Buffers $g\ g$, of rubber or other springy substance, are secured in the ends of the sieve in order to prevent jarring noises.

The tray thus constructed is mounted on legs, as shown, in order to give it the proper height, and to render it more readily portable. It may also be provided with casters and handles, for further facilitating its being moved. The lid or cover of the tray can be readily moved on the tray when one part is turned back, and this feature will often be found valuable in its use.

The bottom of the receptacle C may be made of wood or sheet-iron. The flanges of the cover will also prevent flour and scraps of dough from being scattered off the board or cover.

By sifting the flour directly into the tray where it is to be made up there is much economy of time and material, and fewer utensils or parts are necessary.

Having thus described our invention, what we claim as new and desire to secure by Letters Patent, is—

1. In a tray for use in making bread, &c., the removable flanged cover or lid F, jointed centrally, and either half adapted to be folded back on the other to form a rolling-board, substantially as described.

2. A bread-tray consisting of the jointed flanged cover, removable sieve, sieve-receptacle, dough or sponge compartment, and flour-receptacle, mounted on legs and constructed substantially as described.

MARVIN EUGENE WELLER.
ALBERT AYRES.
WILLIAM THOMAS LINTNER.

Witnesses:
JACOB SNICK,
D. C. SHULTS.